Figure 1:
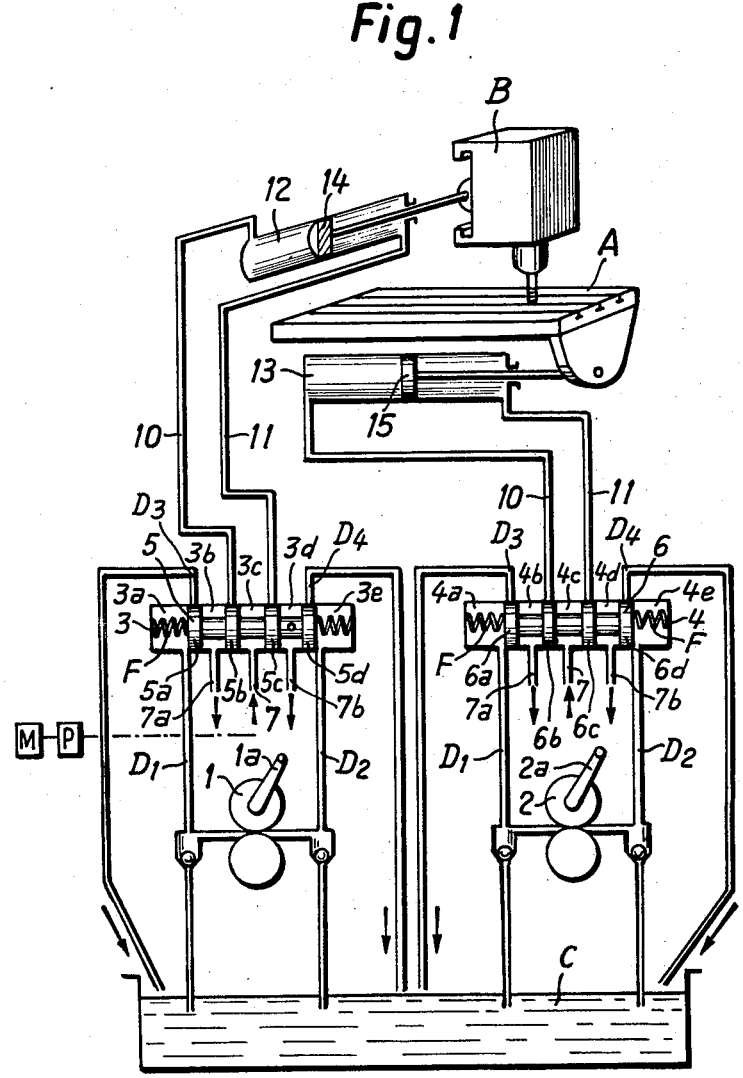

June 2, 1964 R. GLASER 3,135,170
HYDRAULIC CONTROL FOR MOVING ELEMENTS OF A MACHINE TOOL
Filed July 10, 1961 2 Sheets-Sheet 1

INVENTOR.
Rolf Glaser
BY Werner W. Kleeman
ATTORNEY

United States Patent Office 3,135,170
Patented June 2, 1964

3,135,170
HYDRAULIC CONTROL FOR MOVING ELEMENTS
OF A MACHINE TOOL
Rolf Glaser, Rorschach, Sankt Gallen, Switzerland,
assignor to Starrfräsmaschinen AG., Rorschacher-
berg, Switzerland, a corporation of Switzerland
Filed July 10, 1961, Ser. No. 122,770
Claims priority, application Switzerland Dec. 13, 1955
12 Claims. (Cl. 91—461)

The present invention relates to a new and improved constructed hand-operated remote control system for a machine tool wherein the displaceable machine elements are displaced by means of a hydraulic pressure medium.

The hydraulic control of the machine members in machine tools, such as lathe carriages and spindle heads, has up to the present been effected by means of levers or push buttons. This type of control is generally unfamiliar to the operator and it only enables a feed rate corresponding to requirements and control by touch to be obtained with rather extreme difficulty. Since the operator's attention is entirely absorbed by such operation, faulty control is oftentimes possible and very frequently most valuable workpieces are spoiled.

The present invention is characterized in that it provides a control slide valve for regulating the flow of a primary pressure medium in a control system incorporated in a machine tool in which the movable machine elements or members are displaced by means of said primary pressure medium, with the control slide valve being accurately displaced and controlled by a secondary pressure medium forced in predetermined directions by means of a hand-operated pump. To this end, there is provided hand-operated control means for hydraulically displacing machine elements of a machine tool comprising working cylinder means reciprocably supporting working piston means, with said working piston means being operatively connected to said machine elements, respectively, for displacement of the latter via a primary fluid medium. The primary fluid medium may be fed from an electro-motor actuated pump system feeding a high pressure primary medium to the working cylinder means. The electro-motor driven pump system may be supplied from a common supply tank also feeding the hand-operated means, or alternately, a separate supply tank may be provided. Conduit means leading to opposite ends of the working cylinder means are in registry with the slide valve means arranged to distribute said primary pressure medium via said conduit means to said working cylinder means, said slide valve means including spring means maintaining said slide valve means normally in neutral position. Hand-operated pump means actuatable in opposite directions feed a secondary low pressure fluid medium from a supply tank to respective pipe means connecting said pump means with said slide valve means, whereby upon actuation of said pump means in one of said directions said slide valve means will be correspondingly displaced against the action of said spring means to establish communication of said primary pressure medium with one side of said cylinder means via the respective conduit means to thereby cause displacement of the associated piston means and thus of the respective machine elements. Return pipe lines are provided for said secondary pressure medium to return the same to its supply tank and drain-off conduits are arranged to feed the primary pressure medium to its supply tank.

In an alternate embodiment of the invention provision is made for the return of the primary medium from the working cylinder to feed directly into the suction side of the hand-operated pump for the secondary medium. In this embodiment a novelly constructed slide valve having a longitudinal bore and internal valving is provided for return feed of the primary medium into the suction side of the manually actuated pump.

Accordingly, the present invention has for one of its primary objects to provide means affording a hydraulic control system for cooperable machine elements of machine tools which may be located at any desired location from the operator while he is enabled to accurately effect displacement of the machine elements with ease and by touch.

Still a further object of the present invention is to provide a hand-operated control system wherein provision is made for bypassing a primary pressure medium returned from a working cylinder into the suction side of a manually operated pump delivering a secondary fluid medium, to thereby improve the accuracy and sensitivity as well as ease of operation of the control system.

Another important object of the present invention is to provide means facilitating accurate adjustment of cooperable machine elements with respect to one another without the necessity of performing a plurality of manipulations heretofore required.

Yet a further important object of the present invention is to provide a novel hand-operated hydraulic control system wherein cooperable machine elements may be easily adjusted with respect to one another and with minute accuracy.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 2:
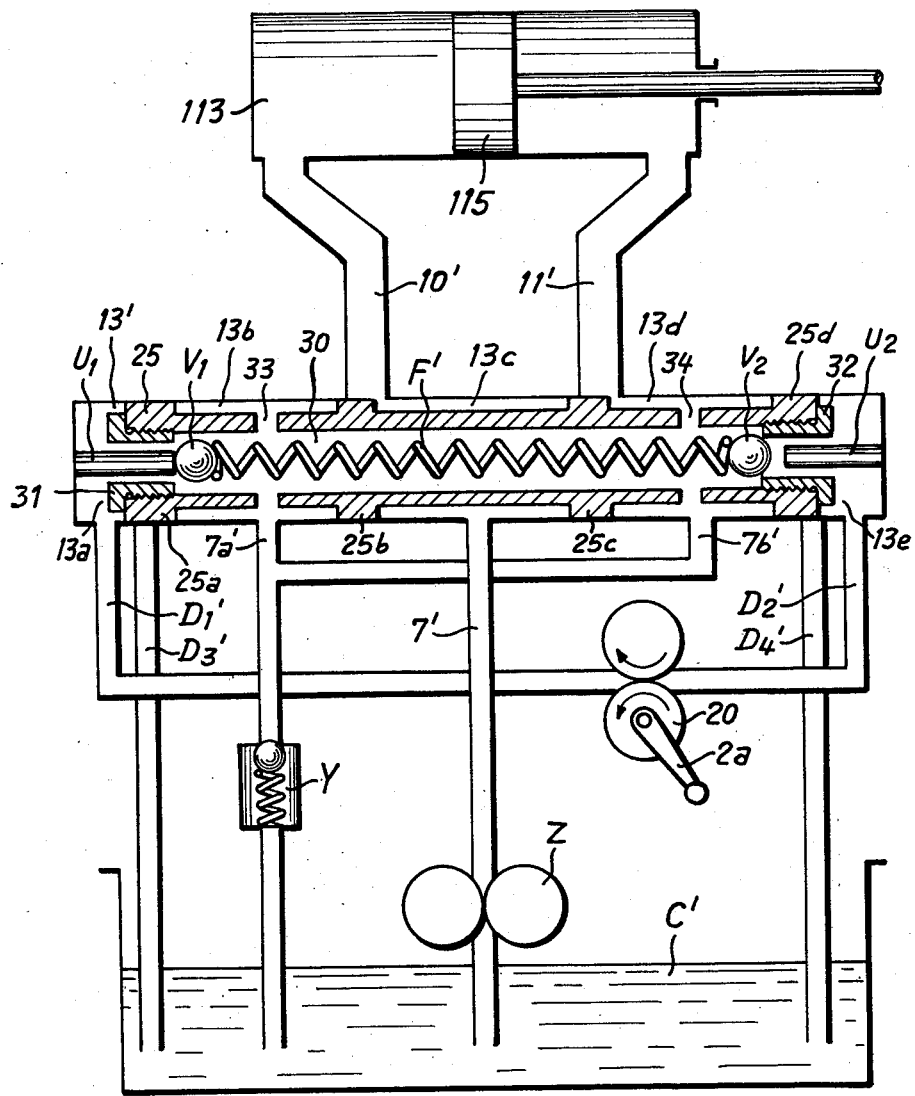

In the drawings:

FIGURE 1 is a diagrammatic view of a duplicating milling machine incorporating an embodiment of the hand-operated hydraulic control system of the present invention; and FIGURE 2 illustrates a further modification of a slide valve arrangement and closed fluid circuit for the manual pump for a hydraulic control system similar to that shown in FIGURE 1.

Referring now to FIGURE 1 of the drawings, there is illustrated a table A and a spindle housing B which must, by way of example, be adjusted relative to each other by manual control for roughing out a die (not shown). To this end, two pumps 1 and 2 are provided for manual actuation as by a respective handwheel having a handle 1a, 2a. The pumps 1 and 2 are of the type which can operate and deliver a quantity of secondary pressurized fluid medium from a supply tank C in either direction of rotation. Pressure lines $D_1$ and $D_2$ are connected to two respective slide valve housings 3, 4 in such a manner that the slide valves 5 and 6 have their front faces acted upon by the secondary pressure medium delivered by the respective pumps 1, 2. Return flow of the secondary pressure medium into the supply tank C is effected via the respective pipe lines $D_3$ and $D_4$. Between the two inner piston members or lands 5b, 5c and 6b, 6c of the respective slide valves 5, 6 defining a respective central compartment 3c, 4c opens a high-pressure primary feed line 7 delivering a primary pressure medium. The primary pressure medium may be delivered from a conventional electric-motor driven pump arrangement P, M, known to the art, and receiving its source of fluid medium from the common supply tank or reservoir C, or alternatively, a separate reservoir may be provided for this motor-pump arrangement P, M. The inner compartments 3b, 3d and 4b, 4d of the respective slide valves 5, 6 are connected to reservoir tank C by the return or drain-off conduits 7a, 7b respectively, which returns the primary pressure medium returned from the respective working cylinders 12, 13 into said supply tank C. A pair of conduit means 10 and 11 for delivery and return of the primary pressure medium communicate with each of the working cylinders 12, 13. The slide valves 5, 6 each have four piston faces or lands 5a, 5b, 5c, 5d and 6a, 6b, 6c, 6d, respectively, and are held in a central or neutral position by the springs F arranged at opposite ends of slide valve housings 3, 4. As is readily apparent, the springs F may be replaced by weights or pendulum means.

Control of the system is effected in such a manner that if, by way of example, the pump 1 is rotated in a clockwise direction by means of its handle 1a, the secondary low pressure medium supplied by the pump 1 is delivered to the slide valve housing 3 via the pressure pipe line $D_2$ and forces the slide valve member 5 far enough to the left for said secondary pressure medium supplied through $D_2$ to return to the supply tank C through return line $D_4$. The piston faces 5a–5d and 6a–6d divide each of the cylinders 3, 4 into five compartments 3a–3e and 4a–4e, respectively. This displacement of the slide valve 5 to the left of the drawing will open the inlet to conduit line 10 far enough for the primary high-pressure medium from the high-pressure feed line 7 to flow into the working cylinder 12 through conduit line 10 so as to displace the working piston 14 to the right. Such movement of the working piston 14 causes any primary pressure medium appearing at the right-hand side of the working cylinder 12 to be returned to the supply tank C via conduit means 11 and drain-off pipe 7b. As is readily to be appreciated, if the pump 1 is rotated in a counter-clockwise direction, the slide member 5 is displaced in an opposite direction so that the working piston 14 is also displaced in an opposite direction. In a similar manner the working piston 15 of working cylinder 13 is displaced when pump 2 is actuated by means of its associated handle 2a.

When the pumps 1 and 2 are rotated slowly, passage of the primary pressure medium to the respective conduit lines 10 or 11 is correspondingly small and the advance of the working piston 14 or 15 is slow, and vice-versa. When the pumps 1 and 2 are inoperative, the respective slide valves 5, 6 are forced into their central or neutral position by the springs F so that the openings to the conduit lines 10 and 11 are closed and the working pistons 14, 15 become immediately stationary. Advantageously, the hand-operated pumps 1 and 2 may be arranged at any distance from their associated working cylinders 12, 13.

In FIGURE 2 there is illustrated a possible modification of the hydraulic control system shown in FIGURE 1 and, more particularly, a variant of the respective slide valve arrangements 3 and 4 of the control system thereof. The slide valve arrangement of FIGURE 2 is quite similar to that shown in FIGURE 1 insofar as it comprises a slide valve housing 13' in which there is reciprocably arranged a slide valve 25 having the piston faces or lands 25a, 25b, 25c, 25d arranged to divide the slide valve housing into five compartments 13a–13e consisting of a central compartment 13c, inner compartments 13b, 13d and outer compartments 13a, 13e. The slide valve 25 is internally provided with an axially extending bore 30. At each end of the slide valve 25 there is threadably arranged a bushing member 31 and 32 which serves as a valve seat for the ball members $V_1$ and $V_2$ respectively. Arranged within the longitudinal bore 30 is a spring member F' which serves to normally urge the ball members $V_1$ and $V_2$ against their respective valve seats 31 and 32 and also to normally maintain the slide valve 25 in neutral position when the hand-operated pump controlled by handle 20a is not actuated. Extending into the bushing members 31 and 32 are pin means $U_1$ and $U_2$ which cooperate with ball valves $V_1$ and $V_2$ to unseat the same according to the displacement of the slide valve 25 in the direction of one or the other end of the housing 13'.

In a manner similar to the arrangement of FIGURE 1, a high pressure pump source Z, which may be of the electro motor driven type known to the art, feeds a primary pressure medium from a supply tank C' via conduit 7' and central compartment 13c to one or the other side of the working piston 115 of working cylinder 113 through the intermediary of conduit means 10' and 11', depending upon the direction of rotation of the hand-operated pump 20. The slide valve 25 is also advantageously provided with radial ports 33 and 34 communicating with conduit means 10' and 11', respectively, to permit any primary fluid medium appearing in working cylinder 113 and acted upon by the moving working piston 115 to flow via conduits 10' or 11' and compartments 13b or 13d, respectively, into the internal bore 30 of the slide valve 25. Drain-off conduits 7a' and 7b' communicate with compartments 13b and 13d, respectively, to by-pass any excess primary fluid medium back into its supply tank C via the spring biased check valve Y.

Similar to the arrangement of FIGURE 1, there is provided a hand-operated pump 20 actuatable in opposite directions via handle 20a to feed a secondary pressure medium under low pressure to compartments 13a or 13e by means of pressure lines $D_1'$ or $D_2'$, respectively, depending upon the rotational sense of the manually controlled pump 20. Additionally, return lines $D_3'$ and $D_4'$ are provided for returning the secondary pressure medium from the respective outer compartments 13a and 13e back to the supply tank C.

Control of the system of FIGURE 2 is effected in such a manner that if, by way of example, the handle 20a of pump 20 is rotated in a clockwise direction, the secondary low pressure medium supplied by the pump 20 is delivered to the outer compartment 13e of the slide valve housing 13' via the pressure pipe line $D_2'$ and forces the slide valve member 25 far enough to the left for said secondary pressure medium supplied through $D_2'$ to return to the tank C' through return line $D_4'$. Such displacement of the slide valve 25 to the left causes the pin $U_1$ to unseat valve $V_1$ as well as to open the inlet to conduit line 10' far enough for the primary high pressure medium from the high pressure source Z to flow into the working cylinder 113 through said conduit line 10' so as to displace the working piston 115 to the right. Such movement of the working piston 115 causes any primary pressure medium appearing at the right-hand side of the working cylinder 113 to be returned via conduit 11' and radial port 34 to the internal bore 30 of the slide valve 25. The thus returned primary pressure medium flows, under a slight pressure, for example, at approximately 0.5 atmospheres absolute pressure through the unseated valve $V_1$ into the suction side of the hand-operated pump 20. Any excess primary pressure medium is returned to supply tank C' via drain-off lines 7b' and check valve Y.

Thus, it will be appreciated thta the arrangement of FIGURE 2 provides a closed fluid system for the hand-operated pump 20. The pump 20 does not require a reservoir or supply source as in FIGURE 1, since the primary pressure medium returned from the working cylinder 113 is always fed directly into the suction side of the pump 20 delivering the secondary pressure medium for initial displacement of the slide valve 25. Moreover, there is continually ensured that the pump 20 is always maintained filled since the fluid volume returned from the working cylinder 113 is considerably greater than the volume of fluid delivered from pump 20 to displace slide valve 25.

Advantageously, it has been found that by virtue of delivering the returned primary pressure medium, which is under a slight pressure directly into the suction side of the hand-operated pump 20, less work is required to operate the hand driven pumps, said pumps are ensured of being completely filled with fluid medium, and the control system becomes even more accurate and sensitive in performing its required functions of precisely displacing machine elements of a machine tool.

When the pump 20 is inoperative, the slide valve 25 is forced into central or neutral position by the spring F' so that the openings to the conduit lines 10' and 11' are closed and the working piston 115 is immediately rendered stationary. As is readily to be appreciated, if the handle 20a of the pump 20 is actuated in a counterclockwise direction, the slide valve 25 is displaced in an opposite direction so that the working piston 115 is also displaced in an opposite direction. It is thus apparent from the foregoing, that the slide valve arrangement of FIGURE 2 can, if desired, readily replace the slide valve units 3, 4 of the control system of FIGURE 1.

The hydraulic control system described hereinabove enables the machine operator to accurately move the machine members as required by touch in an easy and reliable maner familiar to him. The servo-hand operated hydraulic control system of the present invention serves to move with very little effort, rapidly or slowly, forward or backwards, with greatest precison, heavy machine parts far away from the operator. The instant invention can provide for adjustment and shifting of the working piston with an accuracy up to .0005 of an inch.

Having thus described the present invention what is desired to be secured by United States Letters Patent, is:

1. Hand-operated control means for hydraulically displacing machine elements of a machine tool; working cylinder means, working piston means, said working piston means being operatively connected to said machine elements, respectively, for displacement of the latter, conduit means leading to opposite ends of said working cylinder means, means for feeding a primary pressure medium to said working cylinder means, slide valve means arranged to distribute said primary pressure medium via said conduit means to said working cylinder means, hand-operated pump means actuatable in opposite directions for controllably feeding a secondary pressure medium, a tank for pressure medium, respective pipe means connecting said pump means with said slide valve means, whereby upon actuation of said pump means in one of said directions said slide valve means will be correspondingly displaced by said secondary pressure medium to establish communication of said primary pressure medium with one side of said working cylinder means via the respective conduit means to thereby cause displacement of the associated working piston means and thus of the respective machine elements, and return pipe lines for said secondary pressure medium connecting said slide valve means with said tank to return said secondary pressure medium to said tank.

2. Hand-operated control means for hydraulically displacing machine elements of a machine tool according to claim 1; including drain-off lines for returning said primary pressure medium from said slide valve means to its supply source.

3. Hand-operated control means for hydraulically displacing machine elements of a machine tool according to claim 2; wherein said primary and secondary pressure mediums return to a common tank.

4. Hand-operated control means for hydraulically displacing machine elements of a machine tool according to claim 2; wherein said drain-off lines are completely separated from said return pipe lines.

5. Hand-operated control means for hydraulically displacing machine elements of a machine tool; working cylinder means, working piston means, said working piston means being operatively connected to said machine elements, respectively, for displacement of the latter, conduit means leading to opposite ends of said working cylinder means, means for feeding a primary pressure medium to said working cylinder means, slide valve means arranged to distribute said primary pressure medium via said conduit means to said working cylinder means, hand-operated pump means actuatable in opposite directions for controllably feeding a secondary pressure medium, said slide valve means being provided with a longitudinal bore, internal valve means arranged in said longitudinal bore, means cooperating with said internal valve means to communicate said longitudinal bore with the suction side of said hand-operated pump means for delivering primary pressure medium returned from an associated working cylinder directly into said suction side of said hand-operated pump means, a tank for said primary pressure medium, respective pipe means connecting said pump means with said slide valve means, whereby upon actuation of said pump means in one of said directions said slide valve means will be correspondingly displaced by said secondary pressure medium to establish communication of said primary pressure medium with one side of said working cylinder means via the respective conduit means to thereby cause displacement of the associated working piston means and thus of the respective machine elements, and return pipe lines for said secondary pressure medium connecting said slide valve means with said tank to return said secondary pressure medium to said tank.

6. Hand-operated control means for hydraulically displacing machine elements of a machine tool according to claim 5; wherein said internal valve means are arranged adjacent the ends of said slide valve means, said cooperating means being pin members unseating at least one of said internal valve means during displacement of said slide valve means by said secondary pressure medium.

7. Hand-operated control means for hydraulically displacing machine elements of a machine tool according to claim 6; wherein spring means is located in said longitudinal bore to maintain said slide valve means in neutral position when said hand-operated pump means is idle.

8. Hand-operated control means for hydraulically displacing machine elements of a machine tool; working cylinder means, working piston means, said working piston means being operatively connected to said machine elements, respectively, for displacement of the latter relative to each other, conduit means leading to opposite ends of said working cylinder means, means for feeding a primary pressure medium to said working cylinder means, slide vale means including a slide valve cylinder and slide valve piston arranged to distribute feed of said primary pressure medium via said conduit means to said working cylinder means, said slide valve means being provided with spring means maintaining said slide valve piston normally in neutral position, whereby interruption of feed of said primary pressure medium via said conduit means occurs, hand-operated pump means actuatable in opposite directions for controllably feeding a secondary pressure medium, a tank for pressure medium, respective pipe means connecting said pump means with said slide valve means, whereby upon actuation of said pump means in one of said directions said slide valve piston will be correspondingly displaced by said secondary pressure medium against the action of said spring means to establish communication of said primary pressure medium with one side of said working cylinder means via the respective conduit means to thereby cause displacement of the associated working piston means and thus of the respective machine element, return pipe lines for said secondary pressure medium connecting said slide valve means with said tank to return said secondary pressure medium to said tank, said pipe means leading into said slide valve means at respective locations of the latter entirely separate from said conduit means, and lines for draining-off said primary pressure medium from said slide valve means and said working cylinder means for return to its supply source.

9. Hand-operated control means for hydraulically displacing machine elements of a machine tool; working cylinder means, working piston means, said working piston means being operatively connected to said machine elements, respectively, for displacement of the latter relative to each other, conduit means leading to opposite ends of said working cylinder means, means for feeding a primary pressure medium to said working cylinder means, slide valve means including a slide valve cylinder and a slide valve piston arranged to distribute feed of said primary pressure medium via said conduit means to said working cylinder means, said slide valve means being provided with spring means maintaining said slide valve piston normally in neutral position, whereby interruption of feed of said primary pressure medium via said conduit means occurs, hand-operated pump means actuatable in opopsite directions for controllably feeding a secondary pressure medium, a tank for said primary pressure medium, respective pipe means connecting said pump means with said slide valve means, whereby upon actuation of said pump means in one of said directions said slide valve piston will be correspondingly displaced by said secondary pressure medium to establish communication of said primary pressure medium with one side of said cylinder means via the respective conduit means to thereby cause displacement of the associated working piston means and thus of the respective machine element, return pipe lines for said secondary pressure medium connecting said tank with said slide valve means to return said secondary pressure medium to said tank, said pipe means leading into said slide valve means at respective locations of the latter entirely separate from said conduit means, and lines for draining-off said primary pressure medium from said slide valve means and said working cylinder means, said slide valve piston being provided with a longitudinal bore, internal valve means located in said longitudinal bore and port means means communicating one side of said working cylinder with the suction side of said hand-operated pump means via said pipe means to feed at least a portion of the primary pressure medium returned from said working cylinder directly into said hand-operated pump means delivering said secondary pressure medium.

10. Hand-operated control means for hydraulically displacing machine elements of a machine tool; working cylinder means, working piston means, said piston means being operatively connected to said machine elements, respectively, for displacement of the latter relative to each other, conduit means leading to opposite ends of said cylinder means, slide valve means including a slide valve cylinder and a slide valve piston, said slide valve piston being provided with a longitudinally extending bore and radial port means, said slide valve means being arranged to distribute feed of a primary pressure medium via said conduit means to said cylinder means, spring means arranged in said longitudinal bore maintaining said slide valve piston normally in neutral position, whereby interruption of feed via said conduit means occurs, hand-operated pump means actuatable in opposite directions for delivering a secondary pressure medium to displace said slide valve piston, a tank for said primary pressure medium, respective pipe means connecting said pump means with said slide valve means, whereby upon actuation of said pump means in one of said directions said slide valve piston will be correspondingly displaced against the action of said spring means to establish communication of said primary pressure medium with one side of said cylinder means via the respective conduit means to thereby cause displacement of the associated piston means and thus of the respective machine element, return pipe lines for said secondary pressure medium connecting said tank with said slide valve means to return said secondary pressure medium to said tank, said pipe means leading into said slide valve means at respective locations of the latter entirely separate from said conduit means, internal valve means disposed in said longitudinal bore at opposite ends thereof and normally maintained seated by said spring means, rod means cooperating with each internal valve means to unseat one of said internal valve means during displacement of said slide valve means to feed at least a portion of said primary pressure medium returned from said working cylinder means, via said radial port means, said longitudinal bore, said unseated internal valve means and said pipe means, to the suction side of said hand-operated pump means.

11. Hand-operated control means for hydraulically displacing machine elements of a machine tool according to claim 10; wherein said longitudinal bore extends throughout the length of said slide valve piston and communicates with each opposed end of said slide valve cylinder via an associated one of said internal valve means.

12. Hand-operated control means for precisely displacing one machine element of a machine tool relative to another element thereof by means of a hydraulic system; said sytem comprising at least one working cylinder, at least one working piston reciprocably arranged in said working cylinder and operatively connected to said one machine element for displacement of the latter, conduit means in registry with opposite ends of said working cylinder, a slide valve arrangement including a slide valve cylinder and slide piston means displaceable in said slide valve cylinder for distributing a primary high pressure medium via one of said conduit means to one end of said working cylinder, said slide piston means having four piston lands dividing said slide valve cylinder into five separate cylinder portions consisting of a central portion, two inner portions, and two outer portions, respectively, said conduit means communicating with said central portion and said inner portions, respectively, a feed line for said primary high pressure medium connected to said central portion, means for maintaining said slide piston means in a neutral position, at least one hand-operated pump located remote from said working cylinder and from said one machine element to be displaced, a source of pressure medium, said pump being actuatable in opposite directions, respective pipe means connecting said pump with said outer portions of said slide valve arrangement and with said source so that upon actuation of said pump in one of said directions said slide piston means will be correspondingly displaced to establish communication of said primary high pressure medium via said feed line and the respective conduit means with one end of said working cylinder so as to cause displacement of said working piston in the latter and thus of said one machine element, said piston lands separating said pipe means from direct communication with said conduit means at all times and closing said pipe means and said conduit means in said neutral position of said slide piston means, drain-lines for said primary high pressure medium, and return pipe lines for said secondary low pressure medium closed by said slide piston means in said neutral position of the latter and establishing communication, respectively, of said outer portions with said source.

References Cited in the file of this patent

UNITED STATES PATENTS

| | | |
|---|---|---|
| 2,020,951 | Lemon | Nov. 12, 1935 |
| 2,185,277 | Stelzer | Jan. 2, 1940 |
| 2,236,467 | Clench | Mar. 25, 1941 |
| 2,512,979 | Strother | June 27, 1950 |
| 2,637,303 | Cintron | May 5, 1953 |
| 2,675,652 | Chiappulini | Apr. 20, 1954 |
| 2,836,960 | Wittren | June 3, 1958 |